(12) United States Patent
Wang et al.

(10) Patent No.: US 7,477,189 B2
(45) Date of Patent: Jan. 13, 2009

(54) METHODS AND SYSTEMS FOR ACQUISITION, REACQUISITON AND TRACKING OF WEAK NAVIGATIONAL SIGNALS

(75) Inventors: Chi-Shin Wang, Half Moon Bay, CA (US); Zhike Jia, San Jose, CA (US); Yue-Meng Chen, Shanghai (CN); Jian Cheng, Guangzhou (CN); EnYuan Tu, Shanghai (CN)

(73) Assignee: SiRF Technology Holdings, Inc., San Jose, CA (US)

( * ) Notice: Subject to any disclaimer, the term of this patent is extended or adjusted under 35 U.S.C. 154(b) by 0 days.

(21) Appl. No.: 11/694,786

(22) Filed: Mar. 30, 2007

(65) Prior Publication Data

US 2008/0180321 A1   Jul. 31, 2008

Related U.S. Application Data

(60) Provisional application No. 60/887,328, filed on Jan. 30, 2007.

(51) Int. Cl.
G01S 5/14 (2006.01)
G01S 1/04 (2006.01)

(52) U.S. Cl. .............................. 342/357.15; 342/357.12

(58) Field of Classification Search ............ 342/357.12, 342/357.15, 357.02, 357.1
See application file for complete search history.

(56) References Cited

U.S. PATENT DOCUMENTS

| | | | |
|---|---|---|---|
| 5,276,629 A * | 1/1994 | Reynolds | 702/71 |
| 5,841,396 A | 11/1998 | Krasner | |
| 5,945,944 A | 8/1999 | Krasner | |
| 6,041,222 A | 3/2000 | Horton | |
| 6,122,506 A | 9/2000 | Lau | |
| 6,236,623 B1 | 5/2001 | Read | |
| 6,650,879 B1 | 11/2003 | Underbrink | |
| 6,724,342 B2 | 4/2004 | Bloebaum | |
| 6,839,547 B2 | 1/2005 | Nir | |
| 6,867,734 B2 | 3/2005 | Voor | |
| 6,901,265 B2 | 5/2005 | Pratt | |

(Continued)

OTHER PUBLICATIONS

S. Soliman et al., GPS receiver sensitivity enhancement in wireless applications, IEEE MTT-S Symposium on Technologies for Wireless Applications, p. 181-186, Feb. 1999.*

(Continued)

*Primary Examiner*—Fred H Mull
(74) *Attorney, Agent, or Firm*—Pillsbury Winthrop Shaw Pitman LLP (57) ABSTRACT

Provided herein are systems and methods for achieving long coherent integration in a navigational receiver to improve the sensitivity of the receiver and enable the receiver to acquire, reacquire and track signals under very weak signal conditions. In an embodiment, phase compensation is computed based on estimated Doppler frequency, rate of change of the Doppler frequency with time, and second order rate of change of the Doppler frequency. The Doppler frequency may be computed from an orbital model or ephemeris. This phase compensation is used to compensate samples of the input signal for changes in the phase due to the Doppler frequency. Frequency components of the phase-compensated samples are then computed using a frequency analysis such as a Fast Fourier Transform (FFT). The maximum frequency component is taken as an error frequency and used to compensate the samples of the input signal for residual frequency error.

33 Claims, 6 Drawing Sheets

U.S. PATENT DOCUMENTS

| | | |
|---|---|---|
| 6,965,754 B2 | 11/2005 | King |
| 7,053,824 B2 | 5/2006 | Abraham |
| 7,082,292 B2 | 7/2006 | Underbrink |
| 2003/0128158 A1* | 7/2003 | Jandrell ................ 342/357.12 |
| 2003/0219082 A1* | 11/2003 | Tanaka et al. ............... 375/324 |
| 2004/0102165 A1 | 5/2004 | Bloebaum |
| 2005/0162306 A1* | 7/2005 | Babitch et al. ......... 342/357.05 |
| 2007/0152878 A1* | 7/2007 | Wang et al. ............ 342/357.15 |

OTHER PUBLICATIONS

D. Akopian, Fast FFT based GPS satellite acquisition methods, IEE Proceedings—Radar, Sonar and Navigation, vol. 152(4), p. 277-286, Aug. 2005.*

* cited by examiner

METHODS AND SYSTEMS FOR ACQUISITION, REACQUISITON AND TRACKING OF WEAK NAVIGATIONAL SIGNALS

RELATED APPLICATION

This application claims the benefit of U.S. Provisional Application Ser. No. 60/887,328, titled "Methods And Systems For Acquisition of Very Weak Navigation Signals," filed on Jan. 30, 2007.

FIELD OF THE INVENTION

The present invention relates to satellite based navigational receivers with integrated communications receivers, and more particularly to the acquisition, reacquisition and tracking of weak navigational signals in these types of receivers.

BACKGROUND OF THE INVENTION

The global positioning system (GPS) is a satellite based radio-navigation system built and operated by the United States Department of Defense. The Russian government operated 'GLONASS' and European Union proposed 'Galileo' are two other important satellite based navigational systems.

GPS permits a user of the system to determine his or her position on the surface of the earth. The system consists of twenty-four satellites circling the earth at an altitude of about 11,000 miles with a period of about 12 hours. It is possible to have more than twenty-four satellites due to the presence of some spare satellites in the GPS constellation. These satellites are placed in six different orbits such that at any time a minimum of six and a maximum of more than eleven satellites are visible to any user on the surface of the earth except in the polar region. Each satellite transmits an accurate time and position signal referenced to an atomic clock. A typical GPS receiver locks onto this signal and extracts the data contained in it and with signals from a sufficient number of satellites, a GPS receiver can calculate its position, velocity, altitude, and time.

Here, the Global Positioning System (GPS) is considered as an exemplary satellite navigation system. Each of the satellites of the GPS system continuously transmits what is known as Navigation data at a rate of 50 bits/second. The Navigation data contains the clock corrections coefficients, ephemeris, almanacs and some other parameters such as the subframe ID and UTC and some correction terms to correct for the propagation delay due to ionosphere, etc. A subframe consists of 10 words with each word having a length of 30 bits. In this 30 bits, the last 6 bits are parity check bits. A frame on the other hand consists of 5 subframes with the first subframe containing the clock corrections, and the $2^{nd}$ and $3^{rd}$ subframes containing the ephemeris of the satellite from which it is transmitted. This ephemeris gives the accurate position of the satellite and is valid for 4 to 6 hours. The $4^{th}$ and $5^{th}$ subframes contains the almanacs of all the satellites. These almanacs give a less accurate position of the satellites and are valid for up to 6 days. The $4^{th}$ and $5^{th}$ subframes also contain some other navigation parameters. This set of 25 sequentially received frames forms a super frame and contains the alamanacs of all of the satellites.

The above data are BPSK modulated with a carrier at 1575.42 MHZ and are additionally spread by separate Pseudo Random Number (PRN) sequences of length 1023 chips. These sequences repeat every one millisecond. There are separate PRN or Gold sequences for each satellite. These sequences have good correlation properties which makes them easily extractable from very noisy weak signals. The high unique autocorrelation under zero shift condition is useful in accurate navigation.

Even though the transmitted frequency of the carrier signal is constant at 1575.42 MHz, the received frequency at the receiver is different because of the Doppler frequency due to the ever changing distance between the receiver and the satellite. This change occurs because of the earth and satellite motion relative to each other. The velocity of the receiver on earth if any also contributes to this Doppler frequency. Further, the drift in the receiver oscillator frequency introduces additional instability in the local frequency. All of these factors widen the range of the frequency search of the received signal.

The position, velocity and time estimation at the receiver requires the receiver to lock onto a sufficient number of satellite signals and to determine the pseudo range and extract the navigation data. This involves a two dimensional search for the frequency and PRN code phase of each of the satellite signals. Thus it is a two dimensional search in frequency and code phase. The PRN code has 1023 chips and the search has to be done at least half chip intervals. Thus the minimum total code phase to search is 2046 phases. The frequency search involves a search of a number of frequency bins. The number of the bins depends on the bin size and the estimated carrier frequency variation. Further, the bin size depends on the coherent integration length. A correlation over one sequence is usually carried out first with a bin size of 500 Hz. However, for further integrations over several milliseconds the bin size must to be reduced. Thus for a coherent integration over two milliseconds the bin size is 250 Hz. Thus if there are N search bins present, then the acquisition involves the computation of 2046N correlation values. Since the GPS signals are normally weak (low power), this requires several identical confirmation stages before conclusively proving that the signal has been acquired.

A long coherent or non-coherent integration extending over several milliseconds is necessary when the signals are weak. This integration may extend over several hundred milliseconds. A non-coherent integration involves squaring loss and is therefore not efficient. Therefore a coherent integration is usually employed. A long coherent integration of the input signal requires a large number of frequency bins or low residual carrier frequency. If the coherent integration time is $T_c$ seconds, then the carrier frequency or bin size should be less than $$\frac{1}{2T_c}$$

Hz. In addition to this low frequency requirement, it is necessary to remove the navigation data bits in the signal when the integration time is more than 20 milliseconds. If these data bits are not removed, inversion of the samples may occur and integration result is not useful as cancellations in the summation occur. Therefore, it is necessary to remove the embedded data bits. However as explained earlier, most of these data bits are not known a priori except the preamble at the start of each sub-frame. Further, the navigation data bit edges are synchronized with the one millisecond samples, i.e. a data bit edge will be present within a 20 millisecond interval at one of the samples. Of course, this assumes there is a data bit polarity change within this interval because it may be possible to have consecutive data bits of the same polarity in which case the navigation data bit edge cannot be detected. Thus, the preamble start is aligned with each of the successive one millisecond samples as the starting point and the required coherent integration is carried out. The coherent integration results in a large peak when the data in the received signal matches with this local preamble at one of the one millisecond samples. A threshold value can be determined by a number of prior trials. Thus whenever the coherent integration exceeds this threshold the alignment of the local replica with the received signal may be assumed. As the week number is usually known, it is also possible to use 10 bits of the week number in place of preamble or use both of them. It is also possible to use the HOW word when the time information is available. A separate threshold can be determined when the week number or HOW are used. Thus, the known preamble or HOW word or week number of navigation data is assumed in coherent integration over a duration extending over several NAV data bits. As the threshold value can be determined by prior trial or experimentation, the preamble or the HOW word or week number is identified when the computed integration value is higher than a predetermined threshold value. In this scenario, because of interference or noise, it is possible to obtain more than one code phase position having an integration value greater than the threshold. The actual position may be confirmed by coherent integration after 6 seconds when the preamble or HOW repeats. But the value of HOW will increase by 1 after 6 seconds. For example, the actual position may be confirmed when an integration and an integrations 6 seconds later both exceed the threshold. On the other hand when week number is used, the coherent integration should be repeated after 30 seconds, 30 seconds being the repetition time of week number. The integration may have to be repeated several times in order to confirm a single position. Thus, the preamble or HOW word or week number synchronization is confirmed by integrating several times at regular predetermined time intervals, the predetermined time interval being the repeat time of the patterns.

Thus the above signal acquisition by long integration requires a long time to first fix (TTFF) and the computational load is also large with a large memory requirement. Thus there is a need in the art to improve the TTFF under very weak signal conditions such as in an indoor environment.

Sometimes GPS receivers are required to operate under very weak signal conditions as in the case of foliage or indoors. In the present day practice, the receiver may get "assistance" in the form of additional acquisition aiding messages from a server or base station, which may be wireless or Internet based. However, providing this type of assistance requires additional infrastructure and may not be available in all places. Also, the receiver requires additional hardware to receive the aiding messages. Therefore there is a need to develop GPS receivers that operate in "standalone" mode under weak or indoor signal conditions. In other cases of normal signal power a fast start with lower TTFF may be required as in the case of E911 (Enhanced 911). In addition to the above, methods to reduce power consumption in the receiver is also an important requirement in many applications.

Since obtaining the "assistance" requires the change in the infrastructure and protocol, an alternative method of using the frequency accuracy of communication systems like cellular communications, TV signals, DVB-H/T, DAB, etc. are being explored. A Master-Slave method is used in a high precision time synchronization in U.S. Pat. No. 6,236,623. U.S. Pat. No. 6,041,222 discloses a shared reference oscillator controlled by the base station reference signal. U.S. Pat. No. 5,841,396 uses the cellular base station signal to improve the accuracy of the common base oscillator. The other set of patents which include U.S. Pat. Nos. 7,082,292, 6,650,879 and the US patent application 2004/0132421 also use a common clock source calibrated by the base station signal with no calibration from the GPS receiver. Further, no correction is applied for Doppler frequency change. The TCXO of the communication receiver provides the uncorrected 13 Mhz clock (GSM) while an AFC circuit from the GSM provides the precision clock to the GPS baseband. U.S. Pat. No. 6,724, 342 and US patent application 2004/0102165 disclose methods of compensating the common clock drift such as in the case of moving from one cell to another, commonly known as handover. A correction method using a base station signal is disclosed in U.S. Pat. No. 6,965,754 and US patent application 2003/0214436, which also discloses calibration from GPS. Further a temperature correction procedure using a temperature sensor is also included. However, as in the case of the '292, '879, '342 patents and the '421 and '165 patent applications, these methods employ AFC correction through a correction module. The '754 patent does not compensate for the Doppler due to the relative motion between the receiver and satellite. US patent application 2003/0219082 uses the common oscillator in demodulation of the GPS signal. U.S. Pat. No. 6,122,506 discloses a GSM/GPS integrated receiver wherein the oscillator frequency is corrected from the frequency correction beacon (FCB) of GSM. U.S. Pat. No. 6,901,265 uses the base station signal but also depends upon a pilot signal.

All of the above noted references only deal with improving the frequency accuracy of the oscillator and do not disclose time accuracy for improved code phase search to decrease the acquisition time especially under very weak signal reception conditions. U.S. Pat. No. 6,839,547 uses two timing references from the base station in a counter. U.S. Pat. No. 5,945, 944 uses the timing signal from the base station to determine the time of the day through an internal counter. However, this counter is not used for code phase estimation. The frequency calibration signal is not used for code phase estimation. Finally, U.S. Pat. No. 7,053,824 discloses using a time sync signal for code phase estimation and frequency offset information to reduce the frequency range.

The above mentioned prior art reference deal with improving the frequency accuracy of the oscillator and do not address time accuracy for improved code phase search to decrease the acquisition time especially under very weak signal reception conditions. U.S. Pat. No. 6,839,547 uses two timing references from the base station in a counter. U.S. Pat. No. 5,945,944 uses the timing signal from the base station to determine the time of the day through an internal counter. However this counter is not used for code phase estimation. The frequency calibration signal in these references is used for code phase estimation. Finally, U.S. Pat. No. 7,053,824 discloses using a time sync signal for code phase estimation and frequency offset information to reduce the frequency range. Thus, in all of these prior art references, the frequency correction signal is not used for driving a counter and hence the code phase estimation.

SUMMARY

Provided herein are systems and methods for achieving long coherent integration in a navigational receiver to improve the sensitivity of the receiver and enable the receiver to acquire, reacquire and track signals under very weak signal conditions.

In an embodiment, a navigational receiver includes an embedded communication device that is able to receive a highly accurate reference signal from a base station. The receiver uses the reference signal to achieve more accurate code phase and Doppler frequency estimations of navigational signals, thereby reducing the search range in both code phase and carrier frequency. This reduction in the search range allows more computational power to be used in improving the performance of the navigational receiver under weak signal reception conditions.

In an embodiment, phase compensation is computed based on estimated Doppler frequency, rate of change of the Doppler frequency with time, and second order rate of change of the Doppler frequency. The Doppler frequency may be computed from an orbital model or ephemeris. This phase compensation is used to compensate samples of the input signal for changes in the phase due to the Doppler frequency. Frequency components of the phase-compensated samples are then computed using a frequency analysis such as a Fast Fourier Transform (FFT). The maximum frequency component is taken as an error frequency and used to compensate the samples of the input signal for residual frequency error.

The above and other advantages of the exemplary embodiments will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION

Figure 1A:
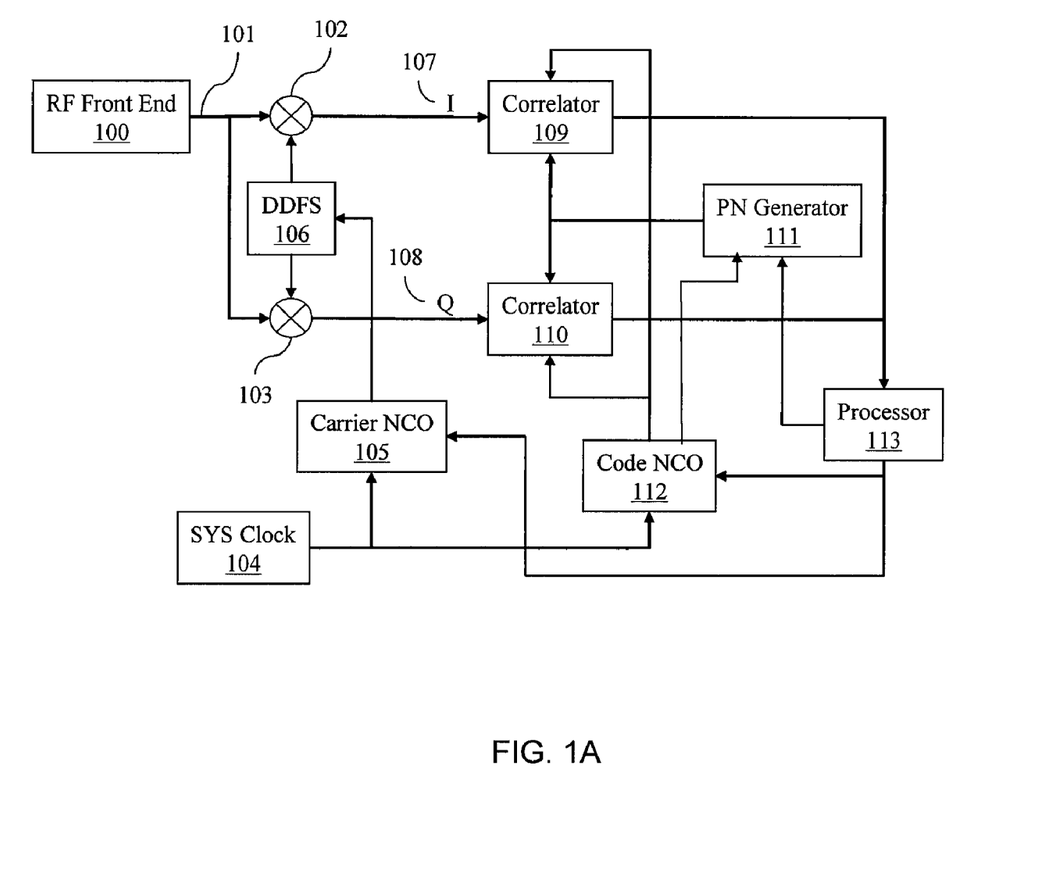
FIG. 1A is a block diagram illustrating a GPS receiver.

FIG. 1A is a functional block diagram of a GPS receiver according to an embodiment of the present invention. An RF front-end 100 processes the RF signal received at the antenna (not shown). Operations of a conversional RF front-end 100 include amplification, down-conversion, and analog-to digital conversion. The RF front end 100 outputs an intermediate frequency (IF) signal 101 to a baseband section of the receiver from its analog-to-digital converter (ADC) output (not shown). The RF front-end 100 down converts the received RF into the intermediate frequency (IF) for baseband processing. The IF signal 101 is made available to two paths, one in-phase (I) and the other in-quadrature (Q). In the I path, the IF signal 101 is multiplied in IF mixer 102 in-phase with a local frequency signal generated by a direct digital frequency synthesizer (DDFS) 106 to produce the in-phase (I) component 107. In the Q path, the same signal 101 is multiplied by the DDFS frequency in-quadrature (i.e., with a phase shift of 90 degrees) to produce the quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of IF signal 101 As a result, the I and Q signals produced by the IF mixers 102 and 103 are near zero carrier frequency. In other words, the outputs I107 and Q 108 of the IF mixers 102 and 103 are stripped or wiped off from the carrier (IF). The I and Q signals may be low-pass filtered to remove the high frequency components which are equal to twice the IF frequency band.

The I and Q components 107 and 108 are correlated in correlators 109 and 110, respectively, with a locally-generated pseudorandom (PN) sequence generated by a PN generator 111. The PN-sequence corresponds to the channel being processed by the baseband section at that time. The PN sequence generator is driven by code NCO 112. The local code generator frequency is made equal to the code rate of the I and Q paths by corrective feedback from the processor 113 to the code NCO 112. In addition, the processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113, as will be described in detail below. Additional details of the receiver baseband section described above can be found in U.S. patent application Ser. No. 11/123,861, titled "Efficient And Flexible GPS baseband Architecture," filed on May 6, 2005, the specification of which is incorporated in its entirety herein by reference.

A navigation or GPS receiver may be embedded with some type of communication device. The communication device may be a cellular device employing any one of the protocols such as CDMA, GSM, PHS or any evolved versions of the same such as WCDMA, UMTS. The communication device may also be another type of communication device such as WIMAX, DVB-H, DVB-T or DAB or any type of device which has a reference clock or pilot signal which can be used to drive a counter in an integrated receiver. In the present disclosure a communication device can refer to a communication device integrated with a navigation receiver or a communication device connected to a navigation receiver, e.g., by a wired or wireless link. The communication device can operate with any one or combinations of the above mentioned protocols. Further, the communication device need not be present in the full form with all the data demodulation, synchronization and protocol handlers, e.g., of a cellular phone. In one embodiment, the communication device may only be able to communicate in one direction, i.e., from the base station to the receiver. In another embodiment, only enough hardware or software may be present in the communication device to extract the time synchronization or frequency correction burst or other timing or frequency signals, all without subscribing to the service.

These communication devices generate reference signals which may be used in the GPS operation. In a communication device with integrated GPS this reference clock can be used to improve the accuracy of the GPS receiver local oscillator, which may be a shared crystal oscillator. Thus, the base station reference clock may be used to improve the performance of the GPS receiver.

As discussed earlier, the improvement in the crystal oscillator stability is one possible approach to improve performance of the GPS receiver while improvement of the crystal oscillator output frequency through an Automatic Frequency Control (AFC) scheme is another possible approach. An improvement in the code phase and Doppler frequency search range can be achieved using the stable or accurate reference signal from the base station of a communication system. Systems and methods of using the reference signal to reduce the code phase and Doppler frequency search range of a navigation receiver can be found in U.S. Provisional Application Ser. No. 60887328, titled "Methods And Systems For Acquisition of Very Weak Navigation Signals," filed on Jan. 30, 2007, the entire specification of which is incorporated herein by reference. The reduction in the search range in both code phase and Doppler frequency results in reduced computational and memory requirements, and decreased hardware gate count. This reduction allows more computational power to be used in improving the performance of the navigational receiver under weak signal reception conditions. Thus, the additional resources made available by the reduction in the search range may be used to improve the sensitivity of the navigational receiver.

As explained earlier with reference to FIG. 1, the baseband section of the navigational receiver outputs one ms length correlation values. These one ms length correlation values are phase compensated in the baseband section. However, they still have some residual phase and frequency error. Additional phase deviation may result due to the dynamics of the receiver. To compute a long coherent integration of the correlation values, it is necessary to further compensate for these residual phase and frequency errors.

Figure 1B:
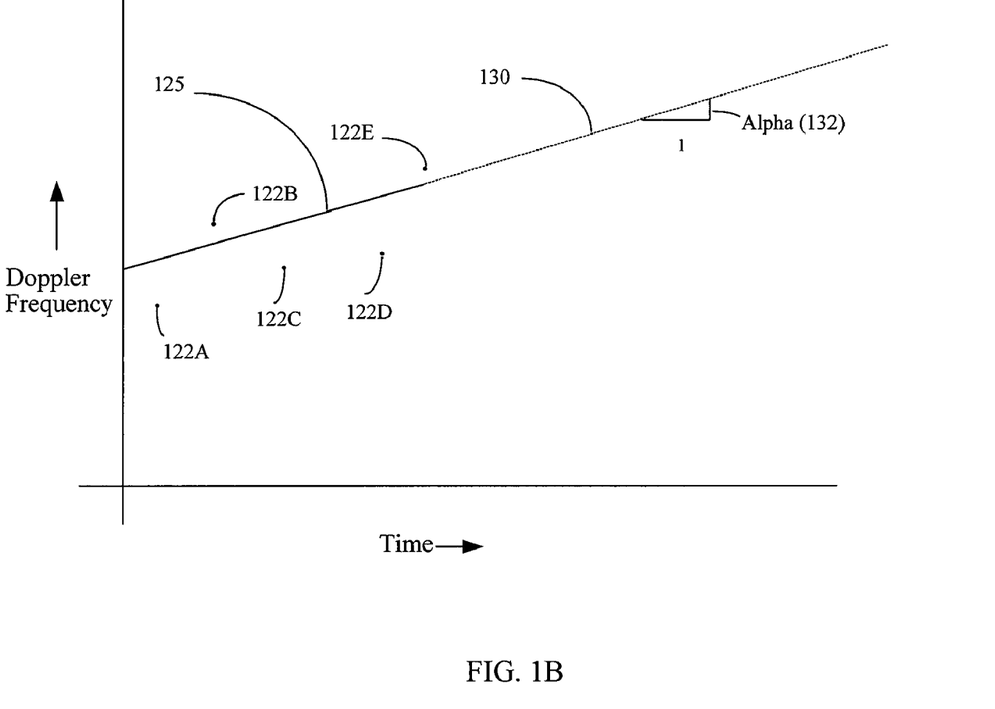
FIG. 1B illustrates an exemplary method of computing a rate of change of frequency.

Therefore, the associated residual Doppler frequency and phase over the length of the integration must be estimated and compensated. In an embodiment, an estimation of the Doppler frequency $f_{est1}$, rate of change of the Doppler frequency $\alpha_1$ and higher order (second order) rate of change of the Doppler frequency $\beta_1$ are made. The Doppler frequency $f_{est1}$ corresponds to the Doppler frequency at the starting time of the first integration. The Doppler frequency $f_{est1}$ may be computed using an orbit model or current ephemeris. The orbit model or ephemeris include parameters for computing the velocity of the satellite as a function of time, which can be used to compute the relative velocity of the satellite to receiver with time. The Doppler frequency at a particular time may then be computed by computing the relative velocity of a satellite to the receiver, and using the relative velocity to find the corresponding Doppler frequency. The rate of change of the Doppler frequency and the higher order rate of change can be obtained by a set of Doppler frequencies over time. As an example of this is shown in FIG. 1B, which shows an exemplary set of Doppler frequencies 122A, 122B, 122C, 122D, 122E, etc. plotted over time. A linear or non-linear curve may be fitted to the set of Doppler frequencies based on minimum mean squared error criteria. The rate of change of the Doppler frequency may then be estimated by computing a rate of change of the curve. In the example in FIG. 1B, a linear curve 125 is fitted to the set of Doppler frequencies, and the estimated rate of change of the Doppler frequency with time $\alpha_1$ 132 is given by the slope of the curve 125. The rate of change of the Doppler frequency may be assumed constant when the receiver is relatively stationary. The receiver may be relatively stationary, e.g., inside a building where signal conditions are weak and improved receiver sensitivity is needed. Thus, the rate of change of the Doppler with time $\alpha_1$ over a given integration length may be assumed to be constant. The second or higher order rate of change of the Doppler frequency can be similarly determined and assumed to be constant within the given integration interval when the variation of frequency is not linear with time. For example, the second order rate of change of the Doppler frequency may be computed, e.g., by computing rates of change of the Doppler frequency at different times, fitting a curve to the rates of change, and computing the second order rate of change from the slope of the curve. In one embodiment, the Doppler frequency $f_{est1}$, rate of change of the Doppler frequency $\alpha_1$ and higher order (second order) rate of change of the Doppler frequency $\beta_1$ are used to compute phases for sub-blocks of a long integration block, as explained further below.

Figure 2:
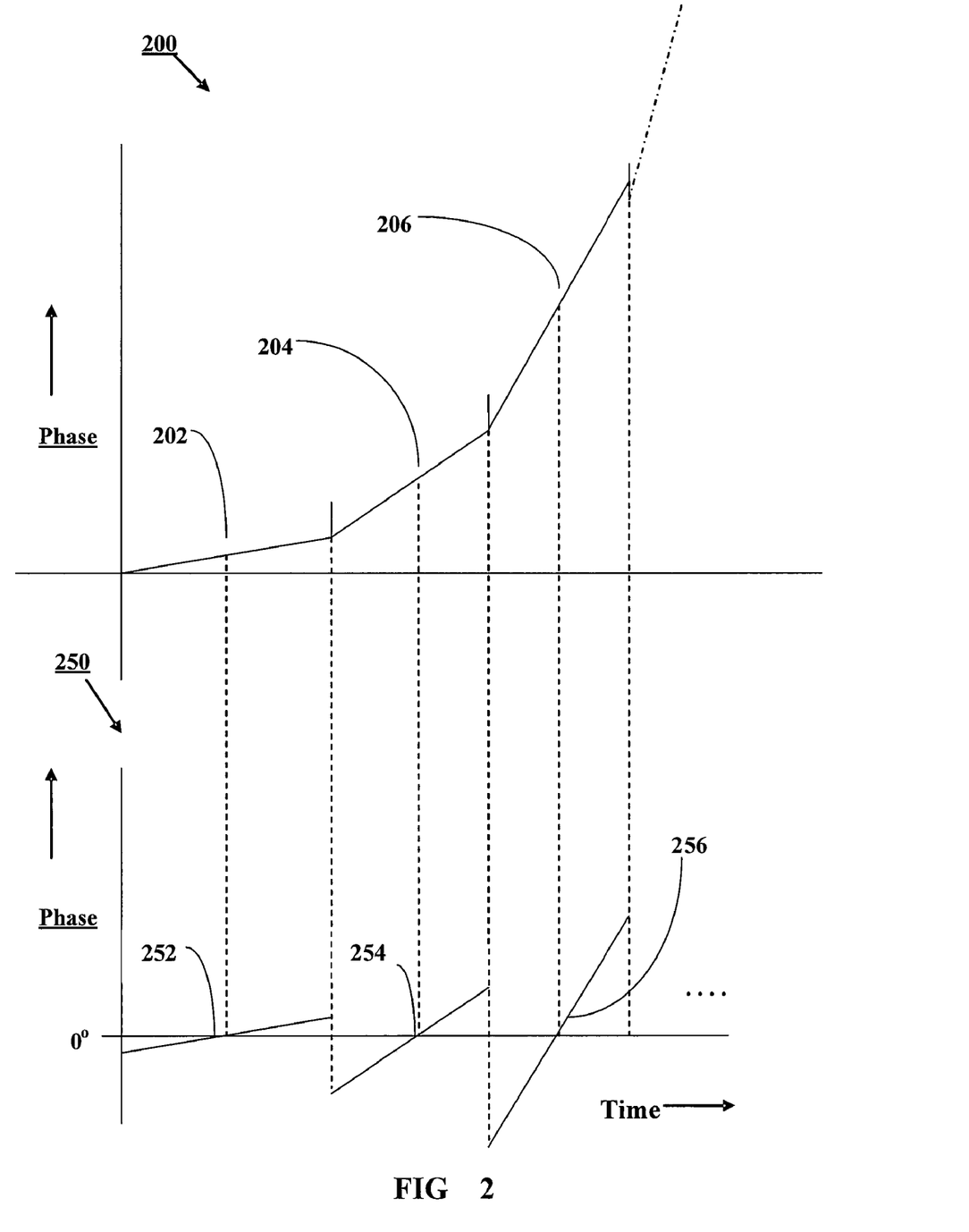
FIG. 2 illustrates a block phase compensation method.

A long integration is needed in the acquisition and tracking of a signal under weak signal conditions. The long integration considered here may extend up to a block of several tens to hundreds of seconds. To facilitate this long integration in one embodiment, the long integration is partitioned into several sub-blocks. Each of these sub-blocks may be several hundred milliseconds long. FIG. 2 shows an example of some of the sub-blocks in a coherent integration block 200. In the coherent integration block 200, the sub-blocks 202, 204 and 206 are the first three sub-blocks in the integration interval. Preferably, each sub-block comprises a set of down-sampled correlation samples, in which the one ms correlation samples or values from the baseband are down-sampled to obtain down-sampled correlation samples, as explained further below. For example, for a down sampling rate of 20:1, each down-sampled correlation sample corresponds to 20 one ms correlation samples. As shown in FIG. 2, the phase of each sub-block is different. A particular sample in each sub-block is selected as the reference sample. In one embodiment, the center sample in each sub-block is taken as the reference sample. However, any sample in each sub-block may be selected as the reference sample, e.g., the first sample in each sub-block. A phase is then estimated for the reference sample in each sub-block to compensate the phase of the sample for the change in phase due to the Doppler frequency, as explained further below.

The estimated frequency at the starting point of the first sub-block or starting time instance of the integration may be determined as $f_{est1}$ given above. The sampling rate after down sampling equals s samples per second.

The frequency of the reference sample at the $i^{th}$ position in the first sub-block is given by:

$$f_{1i} = f_{est1} + \alpha_1 * i/s + (\beta_1/2) * (i/s)^2 \text{ Hz} \quad (1)$$

where $\alpha_1$ is in Hz/sec, $\beta_1$ is the second order change of frequency in Hz/sec$^2$, s is the samples per second, and pi equals 3.14152, which is an approximation of $\pi$.

The corresponding phase of the $i^{th}$ sample is $\phi_1(i)$ and is given by:

$$\phi_1(i_1) = \phi_1(0) + f_{est11} * (i_1/s) * \text{pi} * 2 + \alpha_1 * (1_1/s)^2 * \text{pi} + \beta_1 * (i_1/s)^3 * \text{pi}/3 \text{ radians} \quad (2)$$

The phase of the reference sample of the next sub-block $\phi_2(i_1)$ is also similarly computed with the $i_1$ replaced by $i_2$, the $i_2$ being the sample count from the same starting point of the integration interval. The frequency $f_{est11}$ is the starting point frequency of the first sub-block of first integration length. This phase provides an estimation of the phase due to the Doppler frequency.

In the preferred embodiment, all the sub-blocks will have identically placed reference samples, i.e., the reference sample for each sub-block is in the same relative position within the sub-block. These reference samples are phase rotated to make their phase be zero or some constant value. For each sub-block, the phases of all of the samples in the sub-block are rotated by the phase computed for the corresponding reference sample. In the above example, the phase of each sample in the first sub-block is rotated by $\phi_1$ (reference sample). Thus, the phases of all of the samples in a given sub-block are rotated by the same amount, i.e. by the amount of the phase computed for the corresponding reference sample. This phase rotation provides phase compensation for the sub-blocks, in which the phase of the reference sample for each sub-block is made zero or some constant. An example of this is shown in FIG. 2. In this example, the reference sample is taken at the center of each sub-block. The sub-blocks 252, 254 and 256 are the sub-blocks 202, 204 and 206 after phase rotation, in which each sub-block is phase rotated by the phase computed for corresponding reference sample. The center phase of each sub-block is made zero after phase rotation. This phase compensation compensates the samples for the change in phase due to the Doppler frequency.

In another embodiment, the average phase of each sub-block is computed, and a polynomial is fitted to the average phases over the length of the integration. The initial phase of the next integration length is computed from this polynomial.

As discussed above, prior to the phase computation and compensation, the sub-blocks are down sampled by an appropriate ratio. The down sampling reduces the number of samples by replacing a set of samples with the average value. In an exemplary case of, e.g., 160 samples per sub-block reduces to 8 samples per sub-block after down sampling with a down-sampling ratio of 20:1. In this example, the down sampling is performed by replacing a set of consecutive 20 samples by the average value at the center of the set. The down sampling ratio can be any convenient value and need not be 20:1. Correspondingly, the number of resulting samples per sub-block may be 16, 32, 64, . . . which are appropriate for FFT computation. The down sampling improves the frequency resolution of the frequency components typically obtained from the frequency domain analysis such as FFT.

Figure 3:
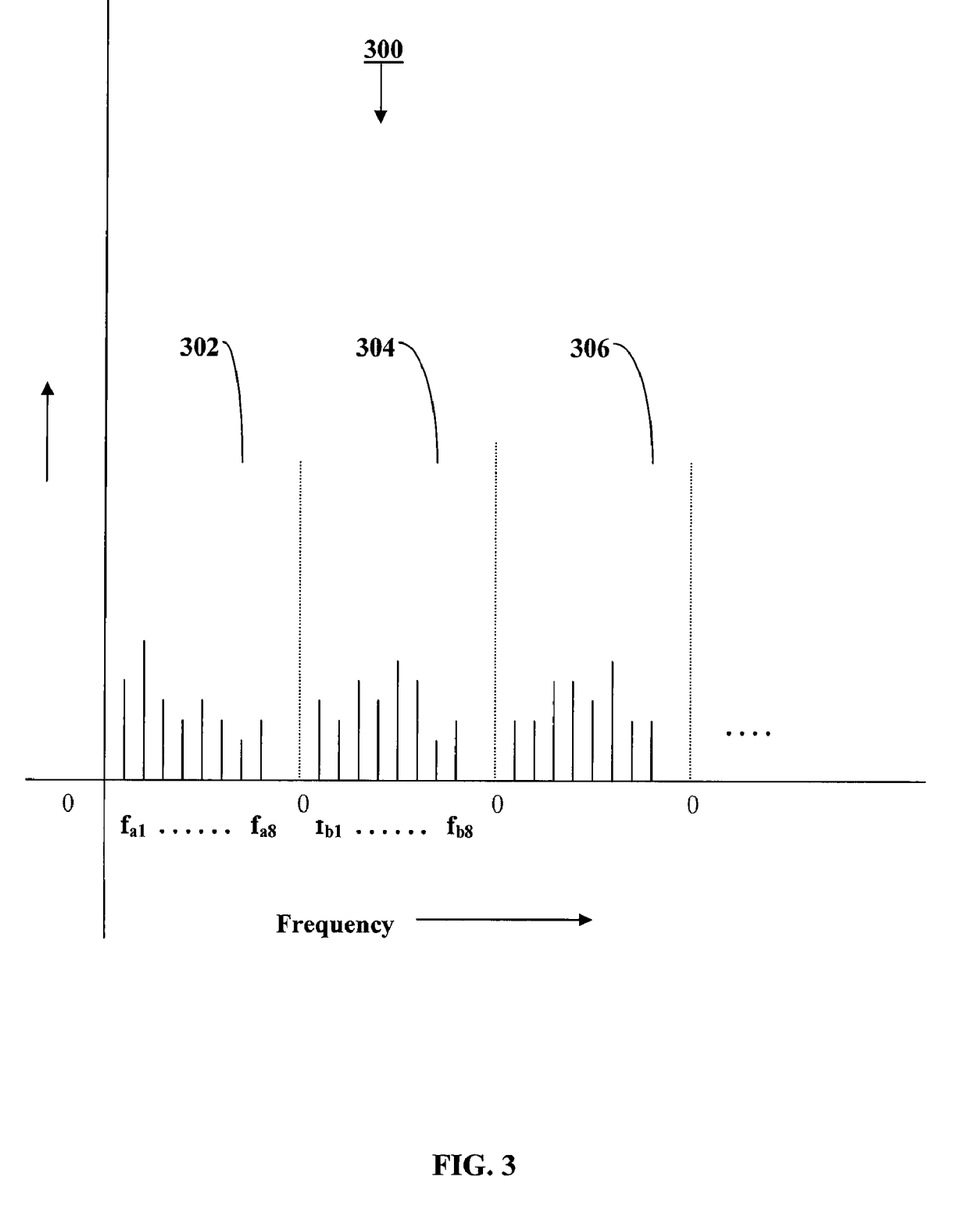
FIG. 3 illustrates the frequency domain components of down-sampled samples in an exemplary case.

The down sampled and phase compensated sub-blocks 252, 254, 256, . . . contain frequency components since the phases of the down-sampled samples which are not at the center or reference sample are not zero. This can be due to the possible quasi stationary nature of the receiver and noise. Therefore, a frequency domain analysis such as Fast Fourier Transform (FFT) may be used to determine the associated frequency components. In the above exemplary case of down sampling 160 samples by a ratio of 20:1 to 8 samples per sub-block, an FFT or DFT of 8-points can be computed. The frequency resolution provided by the FFT improves due to the down sampling. This process is repeated with other sub-blocks of the integration block or integration length. The resulting 8 frequency components of each sub-block are shown as 302, 304 and 306 in 300 of FIG. 3. The frequency component vectors of the first sub-block are $F_{a1}, F_{a2} \ldots F_{a8}$ while that of second and third sub-blocks are $F_{b1}, F_{b2} \ldots F_{b8}$ and $F_{c1}, F_{c2} \ldots F_{c8}$, respectively. Here these quantities are vector in nature having In-phase (I) and Quadrature (Q) components. In order to determine the actual frequency component the respective components are summed up as given below:

$$F_1 = F_{a1} + F_{b1} + F_{c1} + \ldots$$

Similarly, $$F_2 = F_{a2} + F_{b2} + F_{c2} + \ldots$$

. . .

$$F_8 = F_{a8} + F_{b8} + F_{c8} + \ldots$$

Figure 4:
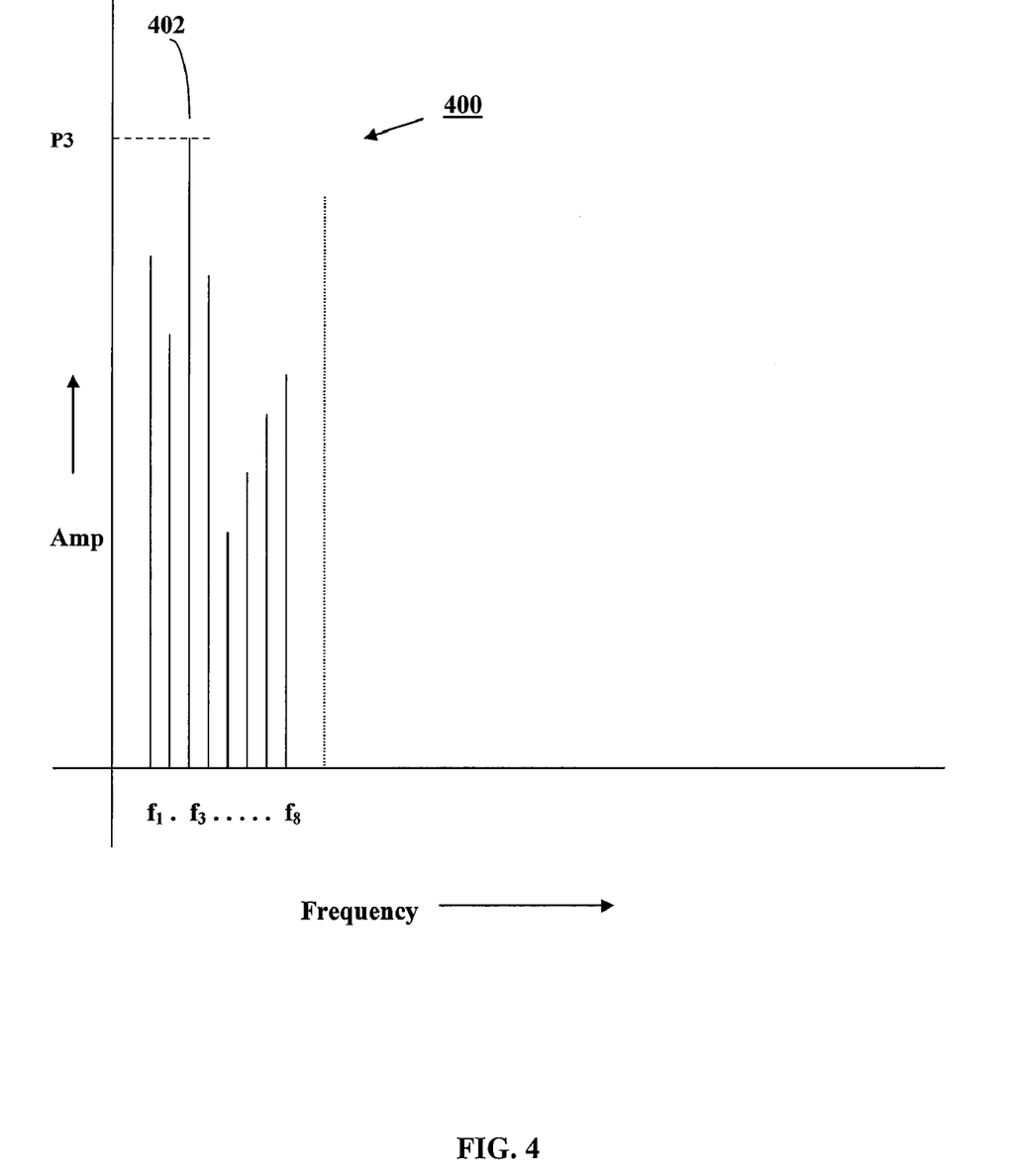
FIG. 4 illustrates the summation of the frequency components to determine the frequency component corresponding to an error frequency.

The sum magnitude components $F_1, F_2, \ldots F_8$, which are obtained by adding and squaring the I and Q components of similar components such as $F_{a1}, \ldots F_{a8}$ separately and taking the square root of the sum, are plotted in FIG. 4. In this example, the component 402 at frequency $f_3$ corresponding to component $F_3$ has the maximum value P3. Therefore the frequency $f_3$ is taken as the error frequency associated with each of the sub-blocks of the integration interval. The samples of the integration are compensated by this phase/frequency in order to coherently integrate the samples as in FIG. 5. This compensation may be performed by, e.g., computing a phase due to the error frequency in a manner similar to that used for computing the phase due to Doppler frequency, and compensating the samples by this phase.

Figure 5:
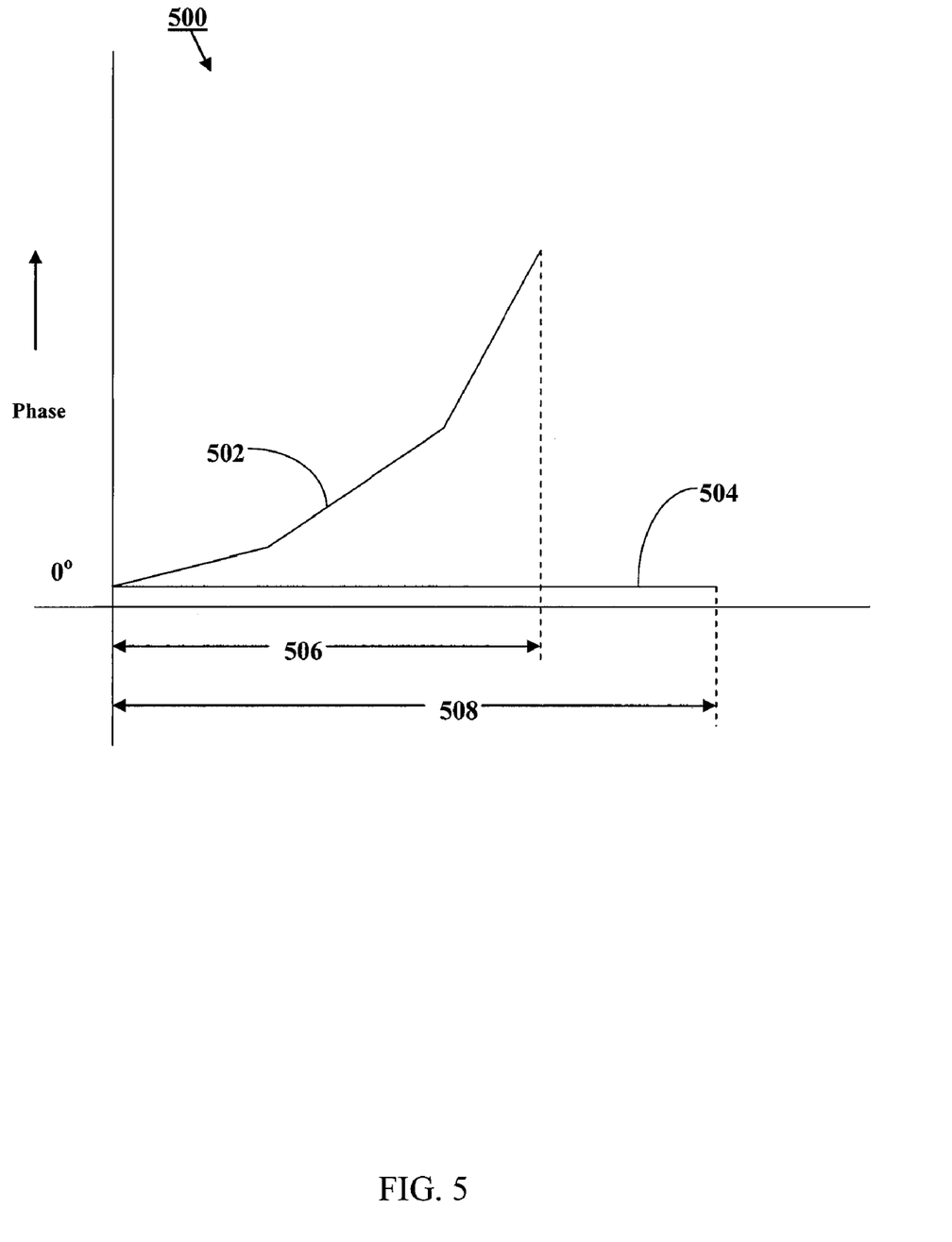
FIG. 5 illustrates the difference between the uncompensated and compensated sub-block integration.

Integration of the set of three sub-blocks 502 without phase compensation results in an integrated value represented by 506. On the other hand, integration of the phase compensated sub-blocks results in an integrated value of 508. Clearly, an excess integrated value of 504 has been achieved due to the phase compensation. The increase in the integrated value results in increased signal sensitivity of the receiver enabling the receiver to determine the presence of the signal even in dynamic, weak and noisy environment.

In the above example, the frequency $f_3$ is the error Doppler frequency during acquisition or reacquisition, and the frequency $f_3$ is the tracking error frequency of the signal in the case of tracking.

Therefore, an FFT or other frequency analysis is used to obtain frequency components for the sub-blocks, and similar frequency components for the different sub-blocks are summed. The frequency component resulting in the largest sum is taken as the error frequency $f_{err1}$.

To improve the accuracy of this error frequency, an interpolation method by a quadratic or higher order polynomial approximation of the adjacent peak frequency components may be employed. In an exemplary interpolation method, a curve is drawn such that it passes through the tips of the adjacent peak frequency components. The maximum value represented by the curve is taken as the error frequency. The initial estimated frequency of the next integration is corrected with this $f_{err1}$. Thus the estimated frequency for the next integration interval is $f_{err1} + f_{est2}$. The $f_{est2}$ is determined through orbit model or current ephemeris. A new set of $\alpha_2$ and $\beta_2$ are also determined for this next integration. In another embodiment, the $f_{est2}$ can be determined as, $$f_{est2} = f_{est1} + \alpha_1 * T + (\beta_1/2) * T^2 \qquad (3)$$

where T is the duration of the present integration in seconds.

Once the phase and frequency of the samples are corrected as above, a long integration is done over the length of the block of phase corrected sub-blocks. In some cases a sliding window based integration may also be employed with the frequency and phase corrected sub-blocks forming the sliding window. The sliding window may consist of samples of the previous integration concatenated with the new phase corrected sample sub-blocks as obtained above. The length of the sliding window may depend upon many factors including the signal power, tracking or acquisition, etc. In the case of tracking with low dynamics, the frequency error is very small and therefore a long window can be used. On the other hand, in the case of acquisition a smaller window can be used. Further, the sub-block size can be small in the case of acquisition and can be longer in tracking with low dynamics. The sliding ratio may depend on the sampling rate. In a high sampling rate system there may be more new samples available in a given set of samples of a given window. In addition, the ratio of new samples to old samples may be changed as per the time interval between the consecutive FFTs.

In the integration, some set of navigation data bits may be known while others may not be known. Under such conditions an integration based on the data aided (DA) and non-data aided (NDA) mode are used in the long integration. The details of this procedure can be found in U.S. patent application Ser. No. 11/584,204, titled "A Method Of Mixed Data Assisted And Non-Data Assisted Signal Acquisition, Tracking and Reacquisition," filed on Oct. 10, 2006, the specification of which is incorporated herein by reference.

In the integration, a weighting factor may be used with each sub-blocks before summing the frequency components. In an embodiment, only I (In-phase) components of the FFT are used in the summation. In another embodiment, after each sample, e.g., Qi and Ii has been phase rotated, a weighting factor may be applied to each phase rotated sample to compensate for noise of the sample. The weighting factor Wi for each sample is given by:

$$Wi = 1 - 2*\arctan g(|Qri/Iri|)/pi \quad (4)$$

The weighting factor is function of the phase of the phase rotated samples Qi and Ii. The higher the phase, the lower the weighting factor because a higher phase corresponds to greater noise. Thus, the weighting factor gives less weight to noisier samples.

The weighting factor is applied to the phase rotated sample as follows:

$$Irwi = Wi * Iir \quad (5)$$

$$Qrwi = Wi * Qir \quad (6)$$

where Irwi and Qrwi represent the weighted phase rotated samples.

In another embodiment, the weighting factor may be applied to each sub-block before summation.

When compensating the frequency and phase of the samples, the local frequency generator or the direct digital frequency synthesizer (DDFS) is also updated periodically. Thus most of the frequency and phase compensation may be done before short term correlations are computed. Thus this method also decreases the later computation load and results in better short term correlations. For example, once the present samples are phase compensated, the carrier NCO phase may be adjusted by increasing or decreasing its phase by the same amount. Thus the phase correction values are accumulated and then periodically applied to the carrier NCO. The accumulated phase may represent the phase due to Doppler frequency over a period of time between adjustments of the carrier NCO.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and ground based systems such as pseudolites. Further all types of communication systems where a stable reference frequency or sync signal is available can be considered as reference signal source. Accordingly, it is intended that the appended claims be interpreted as covering all alterations and modifications as fall within the spirit and scope of the invention.

What is claimed is:

1. A method of operating a navigational receiver under weak signal conditions, comprising:
   correlating a received signal with a local signal to obtain correlation samples;
   grouping consecutive correlation samples into sub-blocks;
   compensating the frequency and phase of the samples in each sub-block;
   determining frequency components of the sub-blocks;
   determining a frequency compensation based on the frequency components;
   performing a long coherent integration over a block of consecutive sub-blocks; and
   using a reference signal from an external communication system.

2. A method of operating a navigational receiver under weak signal conditions, comprising:
   correlating a received signal with a local signal to obtain correlation samples;
   grouping consecutive correlation samples into sub-blocks;
   compensating the frequency and phase of the samples in each sub-block, wherein each sub-block is frequency and phase compensated by rotating all the samples of the sub-block by a phase of a reference sample within the sub-block;
   determining frequency components of the sub-blocks;
   determining a frequency compensation based on the frequency components; and
   performing a long coherent integration over a block of consecutive sub-blocks.

3. The method of claim 2, wherein the frequency compensation is based on the maximum frequency component.

4. The method of claim 2, wherein the phase of the reference sample is computed based on an estimation of a phase due to a Doppler frequency.

5. The method of claim 2, wherein the reference sample is any sample of the sub-block.

6. The method of claim 2, wherein the reference sample for each sub-block is in the same relative position for all of the sub-blocks.

7. The method of claim 2, wherein a Doppler frequency, a frequency change rate and a higher order frequency change rate are used to estimate the phase of the reference sample.

8. The method of claim 2, wherein a down-sampling technique is used prior to frequency and phase rotation.

9. The method of claim 7, wherein the Doppler frequency is determined based on the prior Doppler frequency values and a time rate of change of the Doppler frequency.

10. The method of claim 9, wherein the time rate of change of the Doppler frequency is determined based on a prior variation of the Doppler frequency with time.

11. The method of claim 9, wherein the number of frequency components computed depends upon a residual frequency range.

12. The method of claim 2, wherein a frequency domain technique is used to determine the frequency components of the phase compensated sub-blocks.

13. The method of claim 12, wherein a polynomial interpolation method is used to determine the maximum frequency component.

14. The method of claim 12, wherein the frequency resolution is variable.

15. The method of claim 2, wherein the frequency components of the sub-blocks are computed by summing the respective frequency components of all the sub-blocks.

16. The method of claim 15, wherein the frequency corresponding to the frequency component having the peak sum is used as a frequency for acquisition of the signal.

17. The method of claim 15, wherein the frequency corresponding to the component having the peak sum is used as an error frequency in tracking the signal.

18. The method of claim 2, wherein a local frequency generator is corrected based on the computed phase and frequency compensation.

19. The method of claim 2, wherein a sliding window technique is used in the long integration.

20. The method of claim 19, wherein the sliding window length is adaptively changed.

21. The method of claim 2, wherein the sliding ratio is variable.

22. The method of claim 2, wherein a local frequency generator is updated periodically.

23. A method of operating a navigational receiver under weak signal conditions, comprising:

correlating a received signal with a local signal to obtain correlation samples;

grouping consecutive correlation samples into sub-blocks;

compensating the frequency and phase of the samples in each sub-block;

determining frequency components of the sub-blocks;

determining a frequency compensation based on the frequency components; and performing a long coherent integration over a block of consecutive sub-blocks, wherein a weighting factor is used with the said long integration.

24. A method of operating a navigational receiver under weak signal conditions, comprising:

correlating a received signal with a local signal to obtain correlation samples;

grouping consecutive correlation samples into sub-blocks;

compensating the frequency and phase of the samples in each sub-block;

determining frequency components of the sub-blocks;

determining a frequency compensation based on the frequency components; and performing a long coherent integration over a block of consecutive sub-blocks, wherein both data aided and non-data aided methods of integration are used.

25. A navigational satellite receiver, comprising:

a radio frequency front-end for receiving satellite signals;

a baseband section for processing the received signals into correlation samples; and a processor coupled to the baseband section, wherein the processor groups consecutive correlation samples into sub-blocks, compensates the frequency and phase of the samples in each sub-block wherein the processor frequency and phase compensates each sub-block by rotating all the samples of the sub-block by a phase of a reference sample within the sub-block, computes frequency components of the sub-blocks, computes a frequency compensation based on the frequency components, and performs a long coherent integration over a block of consecutive sub-blocks.

26. The method of claim 25, wherein the frequency compensation is based on the maximum frequency component.

27. The receiver of claim 25, wherein the processor computes the phase of the reference sample based on an estimation of a phase due to a Doppler frequency.

28. The receiver of claim 25, wherein processor computes a Doppler frequency, a frequency change rate, and a higher order frequency change rate, and computes the phase of the reference sample based on the computed Doppler frequency, frequency change rate and higher order frequency change rate.

29. The receiver of claim 28, wherein the processor computes the frequency change rate based on a prior variation of the Doppler frequency with time.

30. The method of claim 25, wherein the processor performs a frequency domain analysis on the phase compensated sub-blocks to determine the frequency components of the phase compensated sub-blocks.

31. The receiver of claim 30, wherein the processor performs a polynomial interpolation on the frequency components to determine the maximum frequency component.

32. The method of claim 25, wherein the processor computes the frequency components of the sub-blocks by summing the respective frequency components of all the sub-blocks.

33. The receiver of claim 32, wherein the processor determines the frequency of the frequency compensation based on the frequency component having the peak sum.

* * * * *